(12) United States Patent
Xu et al.

(10) Patent No.: US 8,165,860 B2
(45) Date of Patent: Apr. 24, 2012

(54) THERMODYNAMIC PROCESS CONTROL BASED ON PSEUDO-DENSITY ROOT FOR EQUATION OF STATE

(75) Inventors: Gang Xu, Irvine, CA (US); David Bluck, Yorba Linda, CA (US); David J. Van Peursem, Irvine, CA (US); Ian H. Boys, Vista, CA (US)

(73) Assignee: Invensys Systems, Inc, Foxboro, MA (US)

( * ) Notice: Subject to any disclaimer, the term of this patent is extended or adjusted under 35 U.S.C. 154(b) by 289 days.

(21) Appl. No.: 12/547,145

(22) Filed: Aug. 25, 2009

(65) Prior Publication Data

US 2011/0054871 A1 Mar. 3, 2011

(51) Int. Cl.
*G06F 9/455* (2006.01)
(52) U.S. Cl. .......................................................... 703/12
(58) Field of Classification Search .................. 703/12, 703/10; 705/7; 702/190; 701/76; 73/149
See application file for complete search history.

(56) References Cited

U.S. PATENT DOCUMENTS

| | | | | |
|---|---|---|---|---|
| 5,911,127 | A * | 6/1999 | Tulpule | 702/190 |
| 6,209,387 | B1 | 4/2001 | Savidge | |
| 6,862,562 | B1 * | 3/2005 | Treiber et al. | 703/12 |
| 7,347,089 | B1 * | 3/2008 | Kelley et al. | 73/149 |
| 7,676,352 | B1 | 3/2010 | Van Peursem et al. | |
| 2006/0116856 | A1 * | 6/2006 | Webb | 703/10 |
| 2008/0235067 | A1 * | 9/2008 | George | 705/7 |
| 2010/0168978 | A1 * | 7/2010 | Schubert et al. | 701/76 |

OTHER PUBLICATIONS

Ruszkowski et al., "Passivity based control of transport reaction systems", American Institute of Chemical Engineers, 2005.*
Mathias, P.M., et al., Effective Utilization of Equations of State for Thermodynamic Properties in Process Simulation, AIChE Journal, Mar. 1984, pp. 182-186, vol. 30, No. 2.

(Continued)

Primary Examiner — Kandasamy Thangavelu
(74) Attorney, Agent, or Firm — Edward S. Jarmolowitz

(57) ABSTRACT

A system for thermodynamic modeling is provided. The system comprises a computer having a processor, a thermodynamic process simulation application, and a thermodynamic equation of state application. When executed by the processor, the thermodynamic equation of state application determines a density root based on a first and second point of departure from an equation of state and based on a first and a second extrapolation equation. The first departure point satisfies the equation $$\frac{\partial P}{\partial \rho} = \beta \frac{P}{\rho} + \Omega.$$

The second departure point satisfies the equation $$\alpha \left( \frac{\partial P}{\partial \rho} - R \right) + (1 - \alpha) \left( \frac{\partial P}{\partial \rho} \right) \bigg|_{dp1} = 0.$$

The density root is determined as a pseudo-density in a phase two when the specified pressure is greater than the second departure point pressure and in a phase one when the specified pressure is less than the first departure point pressure. When executed by the processor, the thermodynamic process simulation application invokes the thermodynamic equation of state application to determine a result based on the density root.

38 Claims, 5 Drawing Sheets

OTHER PUBLICATIONS

B.M. Mognetti et al., "Efficient prediction of thermodynamic properties of quadrupolar fluids from simulation of a coarse-grained model: The case of carbon dioxide", The Journal of Chemical Physics, Mar. 10, 2008, vol. 128, Published online.

Ian A. Johnston, "The Nobel-Abel Equation of State: Thermodynamic Derivations for Ballistics Modelling", Australian Government Department of Defence, Nov. 2005, DSTO-TN-0670, Defence Science and Technology Organisation, Edinburgh, South Australia, Australia.

F. Douglas Swesty, "Thermodynamically Consistent Interpolation for Equation of State Tables", Journal of Computational Physics, Feb. 15, 1996, vol. 127, Academic Press, Inc., Waltham, Massachusetts.

PCT International Search Report; PCT Application No. PCT/US2010/046098; Aug. 20, 2010; 3 pgs.

PCT Written Opinion of the International Searching Authority; PCT Application No. PCT/US2010/046098; Aug. 20, 2010; 6 pgs.

* cited by examiner

THERMODYNAMIC PROCESS CONTROL BASED ON PSEUDO-DENSITY ROOT FOR EQUATION OF STATE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the drive for ongoing improvements in operating efficiency, industrial plants such as chemical plants, refineries, food processing plants, pharmaceutical plants, breweries, and other batch and continuous plant systems may employ computer-based modeling and simulation to optimize plant operations. These modeling systems are typically used to simulate plant processes by defining components and equipment of plants in computer models and then using mathematical computations to project and/or to reveal the behavior of these systems as relevant parameters vary.

This type of modeling may be used to aid in the design and operation of such plants, as well as to provide computer-based training of operators by simulating plant and process responses to variations that can arise in real-world situations without the hazards or costs associated with subjecting plants to these events. In addition, predictions can be made about plant behavior in order to devise tactics for handling such events, should they occur. This type of modeling can also be used to assist in controlling plant operations by predicting system changes and responding accordingly by tying the information produced by the models into control loops of plant equipment.

Modeling of these systems typically involves iterative calculations of complex thermodynamic equations in order to accurately describe static views of dynamic situations. Given the rapidly changing state of these systems and the limitation of only being able to calculate discrete moments in time, this form of modeling can place heavy demands on a computer's central processing unit (CPU) as constant updating is needed to keep the model updated. This heavy processing load challenges the ability to provide accurate data with sufficient speed to obtain predictive models in time to proactively forestall critical situations, thereby rendering plant control in a real world application difficult or impossible.

SUMMARY

In an embodiment, a system is disclosed. The system comprises a computer system, a thermodynamic process simulation application, and a thermodynamic equation of state application. The computer system comprises at least one processor. The thermodynamic equation of state application, when executed by the at least one processor of the computer system, determines a density root based on at least a specified pressure, a specified temperature, and a first point of departure from an equation of state. The first point of departure is determined based on a proportional relationship between the ratio of pressure to density of the equation of state at the first point of departure and the rate of change of pressure with respect to density of the equation of state at the first point of departure, and wherein the density root is determined as a pseudo-density when the specified pressure is less than the pressure at the first point of departure. The thermodynamic process simulation application executes on the at least one processor of the computer system and invokes the thermodynamic equation of state application iteratively to determine a result based on the density root determined by the thermodynamic equation of state application.

In an embodiment, a system comprising a computer system, a thermodynamic process simulation application, and a thermodynamic equation of state application is disclosed. The computer system comprises at least one processor. The thermodynamic equation of state application, when executed by the at least one processor of the computer system, determines a density root based on at least a specified pressure, a specified temperature, a specified composition, and a second point of departure from an equation of state. The second point of departure is determined based at least in part on a proportional relationship between the rate of change of pressure with respect to density of the equation of state and the universal gas constant. The density root is determined as a pseudo-density when the specified pressure is greater than the pressure at the second point of departure. The thermodynamic process simulation application executes on the at least one processor of the computer system and invokes the thermodynamic equation of state application iteratively to determine a result based on the density root determined by the thermodynamic equation of state application.

In an embodiment, a system comprising a computer system, a thermodynamic simulation application, and a thermodynamic equation of state application is disclosed. The computer system comprises at least one processor. The thermodynamic equation of state application, when executed by the at least one processor of the computer system, determines a density root $\rho$ based on at least a specified pressure P, a specified temperature, a specified composition, and a first point of departure from an equation of state ($\rho_{dp1}, P_{dp1}$), wherein when the specified pressure is less than $P_{dp1}$ the density root $\rho$ is determined as a pseudo-density based on an extrapolation equation that comprises a density squared term. The thermodynamic process simulation application, when executed by the at least one processor of the computer system, invokes the thermodynamic equation of state application iteratively to determine a result based on the density root determined by the thermodynamic equation of state application. The system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

In an embodiment, a system comprising a computer system, a thermodynamic process simulation application, and a thermodynamic equation of state application is disclosed. The computer system comprises at least one processor. The thermodynamic equation of state application, when executed by the at least one processor of the computer system, determines a density root $\rho$ based on at least a specified pressure P, a specified temperature, a specified composition, and a second point of departure from an equation of state ($\rho_{dp2}, P_{dp2}$), wherein when the specified pressure is greater than $P_{dp2}$ the density root ρ is determined as a pseudo-density based on an extrapolation equation $$P = P_{dp2} + d\left(\frac{1-g}{1-k\rho}\right)(\rho - \rho_{dp2}) + m\left(\frac{1-g}{1-k\rho}\right)(\rho - \rho_{dp2})^2 + \Omega$$

where d, g, k, and m are constants and where Ω is an optional offset. The thermodynamic process simulation application, when executed on the at least one processor of the computer system, invokes the thermodynamic equation of state application iteratively to determine a result based on the density root determined by the thermodynamic equation of state application. The system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

In another embodiment, a system comprising a computer system, a thermodynamic process simulation application, and a thermodynamic equation of state application is disclosed. The computer system comprises at least one processor. The thermodynamic equation of state application, when executed by the at least one processor of the computer system, determines a density root based on at least a specified pressure, a specified temperature T, a specified composition, a first point of departure from an equation of state, and a second point of departure from the equation of state. The first point of departure is determined as the point $(\rho_{dp1}, P_{dp1})$ on the isothermic curve of pressure P versus density ρ at the specified temperature derived from the equation of state where $$\frac{\partial P}{\partial \rho} = \beta \frac{\partial P}{\partial \rho} + \Omega$$

where β is a constant selected subject to the constraint β≧0.5 and where Ω is an optional offset. The second point of departure is determined as the point $(\rho_{dp2}, P_{dp2})$ on the isothermic curve of pressure P versus density ρ at the specified temperature derived from the equation of state where $$\alpha\left(\frac{\partial P}{\partial \rho} - R\right) + (1 - \alpha)\frac{\partial P}{\partial \rho}\bigg|_{dp1} = 0$$

where a=f(T), where a is a non-negative number less than or equal to 1.0, where R is the universal gas constant, and where $$\frac{\partial P}{\partial \rho}\bigg|_{dp1}$$

is a constant equal to the value of the partial derivative of pressure P with respect to density ρ of the equation of state at the first point of departure for the specified temperature. Further, $\rho_{dp2}$ is less than $\rho_{dp1}$. The density root is determined as a pseudo-density when the specified phase is a phase two and the specified pressure is greater than the pressure at the point $(\rho_{dp2}, P_{dp2})$. The density root is determined as a pseudo-density when the specified phase is a phase one and the specified pressure is less than the pressure at the point $(\rho_{dp1}, P_{dp1})$. The thermodynamic process simulation application executes on the at least one processor of the computer system and invokes the thermodynamic equation of state application iteratively to determine a result based on the density root determined by the thermodynamic equation of state application. The system one of controls a thermodynamic process control component, trains an operator of the thermodynamic process control component, and predicts a failure time of the thermodynamic process control component based on the result determined by the thermodynamic process simulation application.

In an embodiment, a computer program product for a thermodynamic modeling system is disclosed. The computer program product comprises a computer readable storage medium having computer usable program code embodied therein. The computer usable program code determines a density root based on at least a specified pressure, a specified temperature, a specified state, and a first point of departure from an equation of state. The first point of departure is determined based on a proportional relationship between the ratio of pressure to density of the equation of state at the first point of departure and the rate of change of pressure with respect to density of the equation of state at the first point of departure. The density root is determined as a pseudo-density when the specified state is a first state and when the specified pressure is less than the pressure at the first point of departure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
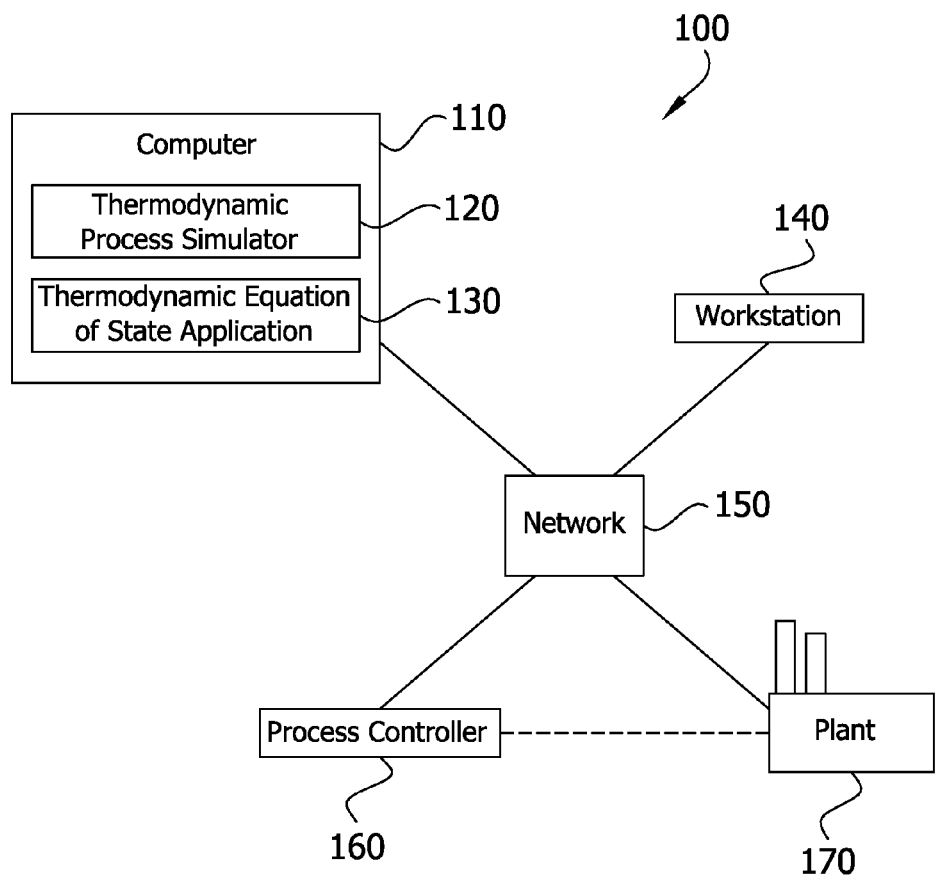
FIG. 1 illustrates a system suitable for implementing several embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and method for modeling and controlling thermodynamic systems. The method can be executed on a computer to calculate and thereby simulate and/or model the characteristics of thermodynamic systems. The method comprises determining pseudo-properties over a dynamically determined portion of the range of an independent variable of a thermodynamic equation of state. Some equations of state may have a form $P=EOS(T,\bar{x},\rho)$, where EOS( ) represents the subject equation of state, where P represents pressure, T represents temperature, $\bar{x}=\{x_1, x_2, \ldots, x_n\}$ represents a mole fraction of an n-component material mixture and/or composition that is the subject of the thermodynamic analysis, for example a mixture of ethane, butane, methane, and other hydrocarbons, and $\rho$ is the density of the material mixture. In an embodiment, the method comprises identifying a first departure point from a curve of pressure versus density at a constant temperature and for a given material composition determined from the equation of state, a second departure point from the curve of pressure versus density. The first departure point is associated with a first phase of the material and the second departure point is associated with a second phase of the material, for example a liquid phase and a vapor phase.

The method also comprises identifying a first extrapolation equation associated with the first phase of the material and a second extrapolation equation associated with the second phase of the material. When the method is invoked for a material in the first phase at a specified pressure lower than the pressure at the first departure point, the first extrapolation equation is used to determine a pseudo-density property. When the method is invoked for a material in the second phase at a specified pressure higher than the pressure at the second departure point, the second extrapolation equation is used to determine the pseudo-density property. In an embodiment, the first departure point $(\rho_{dp1},P_{dp1})$ is determined based on the equation $$\frac{\partial P}{\partial \rho} \propto \frac{P}{\rho}.$$

In an embodiment, the second departure point $(\rho_{dp2},P_{dp2})$ is determined based on the equation $$\frac{\partial P}{\partial \rho} = R,$$

where R is the universal gas constant. In an embodiment, the first extrapolation equation has the form $P=P_{dp1}+b(\rho-\rho_{dp1})+c(\rho-\rho_{dp1})^2$, where b and c are constants. In an embodiment, the second extrapolation equation has the form $P=f(\rho)$, where $f(\rho)$ is quadratic in $\rho$ and where $f(\rho)$ asymptotically approaches the equation of state as P increases and/or at high values of the specified pressure P.

In some known thermodynamic modeling and/or simulation systems the algorithms may too frequently fail to converge to a consistent thermodynamic state solution and the algorithm fails. In other circumstances the known algorithms may converge to a consistent thermodynamic state solution, but too slowly to permit use of the thermodynamic state solution in real-time applications. The known equation of state algorithms are, at least in part, the cause of these failures to converge timely to a consistent thermodynamic state solution. As known to those skilled in the art, computer solutions for quadratic functions are generally more efficient than computer solutions for logarithmic functions, hence the two extrapolation equations identified above may promote improved computational efficiency when determining thermodynamic properties versus other known extrapolation equations, hence enabling the use of the thermodynamic simulation and/or modeling system in real-time applications. Further, the methods for choosing the first and second departure points taught by the present disclosure may, at least in some circumstances, promote more consistent and reliable convergence on a consistent thermodynamic state solution.

FIG. 1 illustrates a system 100 suitable for generating models that simulate and control the physical characteristics of a thermodynamic system according to the embodiments of the disclosure. A computer 110 includes a memory that stores and a processor that invokes a thermodynamic process simulation application 120 and a thermodynamic equation of state application 130. The thermodynamic process simulation application 120 and the thermodynamic equation of state application 130 together implement a thermodynamic model that can be used, for example, to control a thermodynamic process in a plant, train an operator of the thermodynamic process or the plant, to predict a future behavior of the thermodynamic process, and to validate a design of a thermodynamic process component, a thermodynamic process control component, and/or a thermodynamic process.

In an embodiment, by modeling thermodynamic processes to determine a result, such as a flash condition, the computer 110 may control the thermodynamic process in a plant 170. The flash condition may be considered in association with a thermodynamic component, for example, but not by way of limitation, a stripper column, a distillation column, an extractor column, an absorber column, and a compressor. In an embodiment, the result also may comprise a flash condition in a flash evaporator, a distillation condition in a distillation column, an absorption condition in an absorber column, and/or a stripping condition in a stripper column. In another embodiment, by modeling thermodynamic processes, possibly faster than in real-time, to predict a future state of the thermodynamic process, the computer 110 may anticipate an undesirable and/or hazardous operating condition before it occurs and take corrective action automatically and/or notify an operator to take corrective action. Corrective actions may comprise adjusting one or more operating parameters, for example a material mixture input stream flow rate associated with the thermodynamic process. Corrective actions may comprise shutting down one or more motors and/or heaters coupled to the thermodynamic process. By modeling thermodynamic processes, the computer 110 may forecast operating conditions of the thermodynamic process one minute, five minute, ten minutes ahead, based on current process parameters and control inputs. In an embodiment, the thermodynamic process modeling and/or simulation, executed by the computer 110, may forecast the future failure of a thermodynamic process component and/or a thermodynamic process control component, allowing a replacement to be ordered and replacement activities to be scheduled, for example at a time which does not interrupt an in-progress batch process, thereby averting costs associated with wasted materials.

In an embodiment, the computer 110 may receive measurements of thermodynamic variables from the plant 170 via a network 150, for example from sensors coupled to thermodynamic components in the plant 170 such as chambers of a fractionation tower and/or a distillation tower. Sensors of thermodynamic variables may include temperature sensors, pressure sensors, and the like.

The network 150 may be provided by any of a local area network, a public switched telephone network (PSTN), a public data network (PDN), and a combination thereof. Portions of the network 150 may be provided by wired connections while other portions of the network 150 may be provided by wireless connections. Based on the values of the thermodynamic variables, the computer 110 may invoke the thermodynamic process simulation application 120 to determine control and/or command values. The computer 110 may then transmit the control and/or command values via the network 150 to a process controller 160, where the process controller 160 is coupled to the plant 170 and/or a thermodynamic process component in the plant 170 via network 150. The process controller 160 may control the plant 170 and/or one or more thermodynamic process components in the plant 170 based on the control and/or command values received from the computer 110.

The system 100 may further comprise a workstation 140 that may provide a user interface for an operator to interact with the computer 110 and/or the thermodynamic process simulation application 120. In an embodiment, a trainee may use the workstation 140, in association with the computer 110 and the thermodynamic process simulation application 120, to simulate a variety of virtual events associated with the plant 170, for example a motor tripping off line, and the result of the trainee's response to the virtual event in the simulated behavior of the plant 170. This may permit trainees to learn valuable plant management lessons in a safe and consequence-free environment. In an embodiment, a manager of the plant 170 may use the workstation 140 to model the operation of a variety of thermodynamic process components of the plant 170 at different operating points, to analyze advantages and disadvantages associated with operating the plant 170 at these operating points. For example, an increased material throughput may be associated with higher operating costs per unit of product output, but in market conditions of elevated prices for the product, greater profit may nevertheless result from the increased throughput.

The thermodynamic process simulation application 120 and the thermodynamic equation of state application 130 may be stored in the memory of the computer 110. Computers are discussed in more detail hereinafter. In an embodiment, other thermodynamics applications may be stored in the memory of the computer 110 and executed by the processor of the computer 110. Alternatively or additionally, the thermodynamic process simulation application 120 and the thermodynamic equation of state application 130 may be stored on one or more computer readable media, for example floppy disks, compact disks, optical disks, magnetic tapes, magnetic disks, and other computer readable storage media. In an embodiment, the thermodynamic process simulation application 120 and/or the thermodynamic equation of state application 130 may be copied and/or loaded from the computer readable media to the computer 110, for example to a secondary storage of the computer 110, to a non-volatile memory of the computer 110, or to a volatile memory of the computer 110. In an embodiment, the thermodynamic process simulation application 120 and/or the thermodynamic equation of state application 130 may be executed by a processor of the computer 110 reading the instructions implementing the thermodynamic process simulation application 120 and/or the thermodynamic equation of state application 130 from the computer readable media, from secondary storage, from non-volatile memory, and/or from volatile memory. In an embodiment, the instructions or a portion of the instructions implementing the thermodynamic process simulation application 120 and/or the thermodynamic equation of state application 130 may be transmitted to the computer 110 from the network 150, via either a wired and/or a wireless communication link.

The computer 110 invokes the thermodynamic process simulation application 120, and the thermodynamic process simulation application 120 may iteratively invoke the thermodynamic equation of state application 130 to determine a thermodynamic result. As known to those skilled in the art, the thermodynamic process simulation application 120 may invoke the thermodynamic equation of state application 130 with specified values that deviate from feasible thermodynamic state values, for example while the thermodynamic process simulation application 120 is in the process of converging on a consistent solution of thermodynamic state for a thermodynamic system, volume, and/or process. In an embodiment, the thermodynamic equation of state application 130 may return pseudo-properties when invoked with infeasible values. In an embodiment, it may be desirable that the pseudo-properties returned by the thermodynamic equation of state application 130 promote convergence of the solution sought by the thermodynamic process simulation application 120.

In an embodiment, the thermodynamic equation of state application 130 determines a density $\rho$ from an equation of state based on at least a specified temperature T and a specified pressure P. Temperature T may be represented in units of degrees Kelvin. Pressure P may be represented in units of Pascals. Density $\rho$ may be represented in mole/liter. In an embodiment, a composition $\bar{x}=\{x_1, x_2, \ldots, x_n\}$ that represents a mole fraction of an n-component material mixture and/or composition that is the subject of the thermodynamic analysis, also may be specified. The composition $\bar{x}$ having n components may comprise n variables $\{x_1, x_2, \ldots, x_n\}$, where x comprises a mole of the subject material and each $x_i$ represents the mole fraction of the associated component. For example, a mole quantity of a material mixture comprised of 0.2 mole of ethane, 0.3 mole of butane, and 0.5 mole of methane may be represented as $\bar{x}=\{x_1=0.2, x_2=0.3, x_3=0.5\}$. While the quantity of the subject material may be analyzed based on a reference mole quantity, the actual quantity of the subject material within the thermodynamic process may be a different quantity. While the above units are consistent with the International System of Units (SI), any consistent system of units may be employed. In an embodiment, a phase or an assumed phase of the material may also be specified.

The equation of state solved by the thermodynamic equation of state application 130 may be represented as:

$$P=EOS(T,\bar{x},\rho) \qquad (1)$$

A number of different equations of state are known to those skilled in the art. In an embodiment, the processing of the thermodynamic equation of state application 130 may be based on a Soave-Redlich-Kwong (SRK) equation of state or another equation of state derived from the SRK equation of state, but in other embodiments the thermodynamic equation of state application 130 may be based on a different equation of state. Different equations of state may be preferred for modeling and analyzing different thermodynamic systems, and it is contemplated that the teachings of the present disclosure may be applied to these different equations of state.

Figure 2:
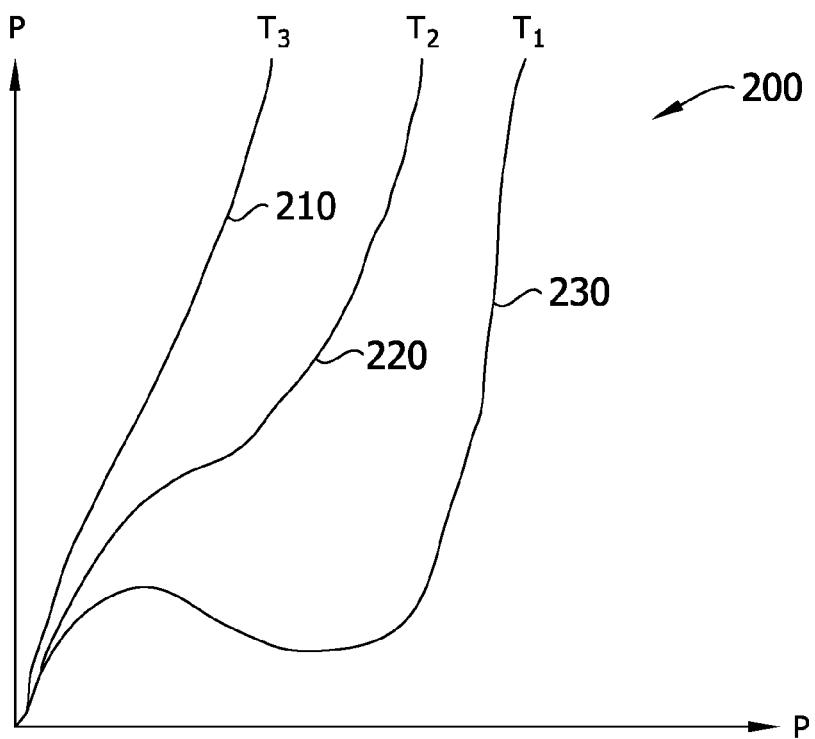
FIG. 2 illustrates an exemplary family of pressure versus density curves parameterized by temperature determined from an equation of state.

FIG. 2 illustrates a family of pressure versus density curves 200 plotted from an equation of state having the general form of equation 1 set forth above. A first curve 230 represents pressure versus density at a constant temperature $T_1$ for the specified material $\bar{x}$. A second curve 220 represents pressure versus density at a constant temperature $T_2$ for the specified material $\bar{x}$. A third curve 210 represents pressure versus density at a constant temperature $T_3$ for the specified material $\bar{x}$. In the case of the exemplary curves 210, 220, 230, temperature $T_1$ is less than temperature $T_2$, and temperature $T_2$ is less than temperature $T_3$. Note that at low temperature $T_1$, the curve 230 plotted based on the equation of state may exhibit generally cubic structure while at high temperature $T_3$, the curve 210 plotted based on the equation of state may exhibit generally linear structure. Further, note that over a middle portion of curve 230, the pressure P decreases with increasing density ρ (the equation of state is a decreasing function having negative slope over this middle portion of curve 230) while over an initial portion and over a later portion of the curve 230, the pressure P increases with increasing density ρ (the equation of state is an increasing function having positive slope over these initial and later portions of the curve 230).

In some thermodynamic analysis models it may be preferred to employ one or more extrapolation equations in the place of the equation of state to determine thermodynamic properties at least over a portion of the range of the density ρ, for example over a middle portion of the range of the density ρ. The properties determined based on the extrapolation equations may be referred to as pseudo-properties. Generally, it may also be preferred to minimize the range of density ρ over which pseudo-properties are determined.

Figure 3:
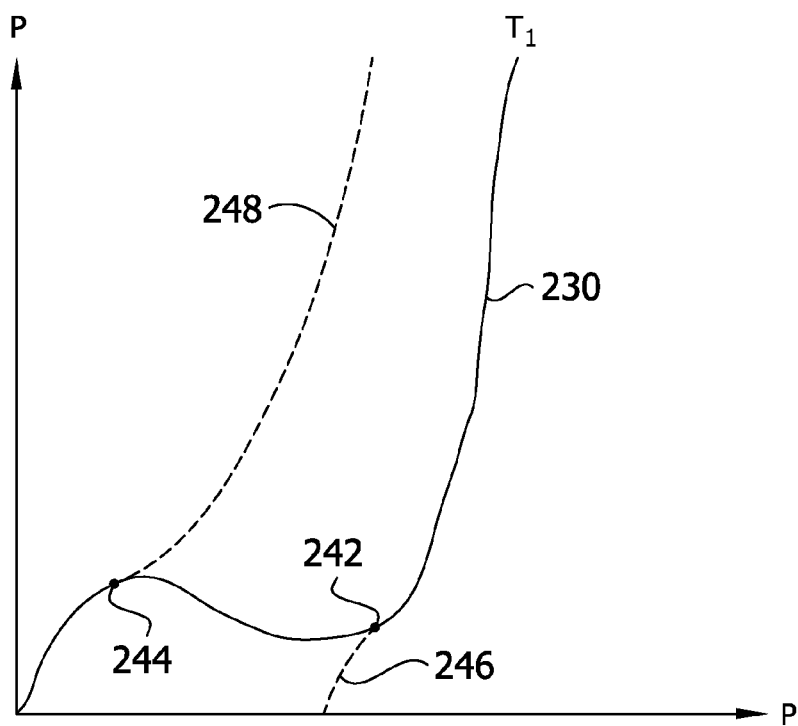
FIG. 3 illustrates an exemplary pressure versus density curve at a first temperature including a plot of pseudo-properties.

Turning now to FIG. 3, a first set of extrapolation curves associated with the temperature $T_1$ is described. In an embodiment, a first departure point 242 associated with a first phase of the material is located at point $(\rho_{dp1}, P_{dp1})$ and a second departure point 244 associated with a second phase of the material is located at point $(\rho_{dp2}, P_{dp2})$. In some contexts, the first phase of the material may be referred to as phase one and the second phase of the material may be referred to as phase two. In an embodiment, the phase one may be a liquid phase of the material and the phase two may be a vapor phase of the material. In other embodiments, however, the phase one and the phase two may be other phases of the material. When the material is specified to be in phase one and the pressure is greater than $P_{dp1}$, the thermodynamic properties of the material may be determined using the equation of state. When the material is specified to be in phase one and the pressure is less than $P_{dp1}$, the thermodynamic properties of the material are determined as pseudo-properties based on using a first extrapolation equation and the dotted line curve 246 is produced. For example, when the material is specified to be in phase one and the pressure is less than $P_{dp1}$, a density root may be determined as a pseudo-density by the thermodynamic equation of state application 130 using the first extrapolation equation and returned to the thermodynamic process simulation application 120.

When the material is specified to be in phase two and the pressure is less than $P_{dp2}$, the thermodynamic properties of the material may be determined using the equation of state. When the material is specified to be in phase two and the pressure is greater than $P_{dp2}$, the thermodynamic properties of the material are determined as pseudo-properties based on using a second extrapolation equation and the dotted line curve 248 is produced. For example, when the material is specified to be in phase two and the pressure is greater than $P_{dp2}$, a density root may be determined as a pseudo-density by the thermodynamic equation of state application 130 using the second extrapolation equation and returned to the thermodynamic process simulation application 120.

In some contexts, the first departure point 242 may be referred to as a phase one departure point and the second departure point 244 may be referred to as a phase two departure point. When phase one corresponds to a liquid phase of the material, the first departure point 242 may be referred to as a liquid departure point. When phase two corresponds to a vapor phase of the material, the second departure point may be referred to as a vapor departure point.

In an embodiment, the first departure point 242 may be determined, for a specified temperature T, based on a proportional relationship between the ratio of pressure to density of the equation of state at the first point of departure and the rate of change of pressure with respect to density of the equation of state at the first point of departure. In an embodiment, the first departure point 242 may be determined as the point $(\rho_{dp1}, P_{dp1})$ that satisfies the equation $$\frac{\partial P}{\partial \rho} = \frac{P}{\rho} \tag{2}$$

In words, the first departure point 242 may be determined as the point $(\rho_{dp1}, P_{dp1})$ where the tangent line to the curve of pressure P versus density ρ coincides with a line through the point and the origin of the pressure P versus density ρ axes. In another embodiment, however, the criteria of equation 2 may be relaxed somewhat, and the first departure point 242 may be determined as the point $(\rho_{dp1}, P_{dp1})$ that satisfies the equation $$\frac{\partial P}{\partial \rho} = \beta \frac{P}{\rho} + \Omega \tag{3}$$

where β is a constant chosen based on the constraint β>0.5 and where Ω is an optional offset. Finding the departure point as the point that satisfies equation 3 still may be said to be based on a proportional relationship between the ratio of pressure to density of the equation of state at the first point of departure and the rate of change of pressure with respect to density of the equation of state at the first point of departure, notwithstanding the inclusion of the Ω optional offset. The value of Ω may be zero (0), may be a non-zero constant value, or may be a function of one or more thermodynamic parameters of the plant 170 and/or the process controller 160. In an embodiment, the value of Ω may be a function of temperature T. In this case, for a specific value of temperature T, the value of Ω may be considered to be a constant. In another embodiment, β is a constant chosen based on the constraint 3.0≧β≧0.7. In another embodiment, β=1.0, in which case equation 3 is substantially identical to equation 2. In another embodiment, β is a constant chosen so that the tangent line to the curve of pressure P versus density ρ at the point $(\rho_{dp1}, P_{dp1})$ makes an acute angle of less than 20 degrees with the line through the point (ρ=0,P=0) and the point $(\rho_{dp1}, P_{dp1})$. In another embodiment, β is a function of temperature T. In this case, for a specific value of temperature T, β may be considered to be a constant.

In an embodiment, the first extrapolation equation comprises a density squared term and may be said to be quadratic in density ρ. In an embodiment, the first extrapolation equation may be defined as $$P = P_{dp1} + b(\rho - \rho_{dp1}) + c(\rho - \rho_{dp1})^2 + \Gamma \tag{4}$$

where b and c are constants and where Γ is an optional offset. The value of Γ may be zero (0), may be a non-zero constant value, or may be a function of one or more thermodynamic parameters of the plant 170 and/or the process controller 160. In an embodiment, the constants b and c may be defined by $$b = \left.\frac{\partial P}{\partial \rho}\right|_{dp1} \tag{5}$$

-continued $$c = -\frac{(P_{dp1} + b\varphi)}{\varphi^2} \quad (6)$$

$$\varphi = \rho_{sp} z_{dp1} - \rho_{dp1} z_{dp1} \quad (7)$$

where $$\left.\frac{\partial P}{\partial \rho}\right|_{dp1}$$

is the partial derivative of pressure P with respect to density $\rho$ at $(\rho_{dp1}, P_{dp1})$, where $\rho_{sp}$ is the density $\rho$ at the spinoidal point of the equation of state and where $z_{dp1}$ is the compressibility of the material at the first departure point. In another embodiment, however, the constants b and c may be defined differently and have different values. In an embodiment, the first extrapolation equation promotes convergence of the thermodynamic state solution processing in the thermodynamic process simulation application 120.

In an embodiment, the second departure point 244 may be determined based, at least in part, on a proportional relationship between the rate of change of pressure with respect to density of the equation of state and the universal gas constant. In an embodiment, the second departure point 244 may be determined as the point $(\rho_{dp2}, P_{dp2})$ that satisfies the equation $$\frac{\partial P}{\partial \rho} = R \quad (8)$$

where R is the universal gas constant. In one system of units, the universal gas constant R may be approximated as $$R \approx 8.314472 \frac{\text{Pascals} \times \text{Meters}^3}{\text{mole} \times {}^\circ \text{K.}} \quad (9)$$

The universal gas constant R in some embodiments may be extended to additional significant figures, shortened to fewer significant figures, expressed as a different value, and/or expressed according to a different system of units. In another embodiment, the criteria of equation 8 may be relaxed somewhat, and the second departure point 244 may be determined as the point $(\rho_{dp2}, P_{dp2})$ that satisfies the equation $$\frac{\partial P}{\partial \rho} = \delta R \quad (10)$$

where R is the universal gas constant and where $\delta$ is a constant chosen based on the constraint $0 \leq \delta \leq 10$.

In another embodiment, the second departure point 244 may be defined as the point $(\rho_{dp2}, P_{dp2})$ that satisfies the equation $$\alpha\left(\frac{\partial P}{\partial \rho} - R\right) + (1-\alpha)\left.\frac{\partial P}{\partial \rho}\right|_{dp1} = \Delta \quad (11)$$

where $a = f(T)$, with the constraint that $0 < a \leq 1$ and $$\frac{d\alpha}{dT} < 0,$$

and where $\Omega$ is an optional offset. The value of $\Delta$ may be zero (0), may be a non-zero constant value, or may be a function of one or more thermodynamic parameters of the plant 170 and/or the process controller 160. In an embodiment, the value of $\Delta$ may be a function of temperature T. In this case, for a specific value of temperature T, the value of $\Delta$ may be considered to be a constant. The general effect of equation 11 is that for low temperatures and for $\Delta = 0$, the second departure point 244 is determined substantially according to equation 8 above while for high temperatures, the second departure point 244 approaches the first departure point 242 from below (e.g., where $\rho_{dp2} < \rho_{dp1}$ and $P_{dp2} < P_{dp1}$). In an embodiment, $f(T) < 0.2$ for $T > 2000^\circ$ K. In another embodiment, $f(T) = 1.0$ for all non-negative values of T, under which condition equation 11 is substantially the same as equation 8. In some thermodynamic simulation and/or modeling situations, equation 11 may provide advantages that overcome the disadvantages of the added complexity.

In an embodiment, the second extrapolation equation comprises a density squared term and may be said to be quadratic in density $\rho$. In an embodiment, the second extrapolation equation may be defined as $$P = P_{dp2} + d\left(\frac{1-g}{1-k\rho}\right)(\rho - \rho_{dp2}) + m\left(\frac{1-g}{1-k\rho}\right)(\rho - \rho_{dp2})^2 + \Lambda \quad (12)$$

where d, g, k, and m are constants, and where $\Lambda$ is an optional offset. The value of $\Lambda$ may be zero (0), may be a non-zero constant value, or may be a function of one or more thermodynamic parameters of the plant 170 and/or the process controller 160. In an embodiment, the value of $\Lambda$ may be a function of temperature T. In this case, for a specific value of temperature T, the value of $\Lambda$ may be considered to be a constant. In an embodiment, the constants d, g, and m may be defined as $$d = \left.\frac{\partial P}{\partial \rho}\right|_{dp2} \quad (13)$$

$$g = k\rho_{dp2} \quad (14)$$

$$m = e^R - 1 \quad (15)$$

where $$\left.\frac{\partial P}{\partial \rho}\right|_{dp2}$$

is the partial derivative of pressure P with respect to density $\rho$ of the equation of state at the second departure point $(\rho_{dp2}, P_{dp2})$. In an embodiment, k is chosen such that $1/k$ is equal to the asymptote of the equation of state as pressure P increases. Alternatively, in an embodiment, k is chosen such that second extrapolation equation asymptotically approaches the equation of state at high specified pressure. In an embodiment, the second extrapolation equation promotes convergence of the thermodynamic state solution processing in the thermodynamic process simulation application 120.

Figure 4:
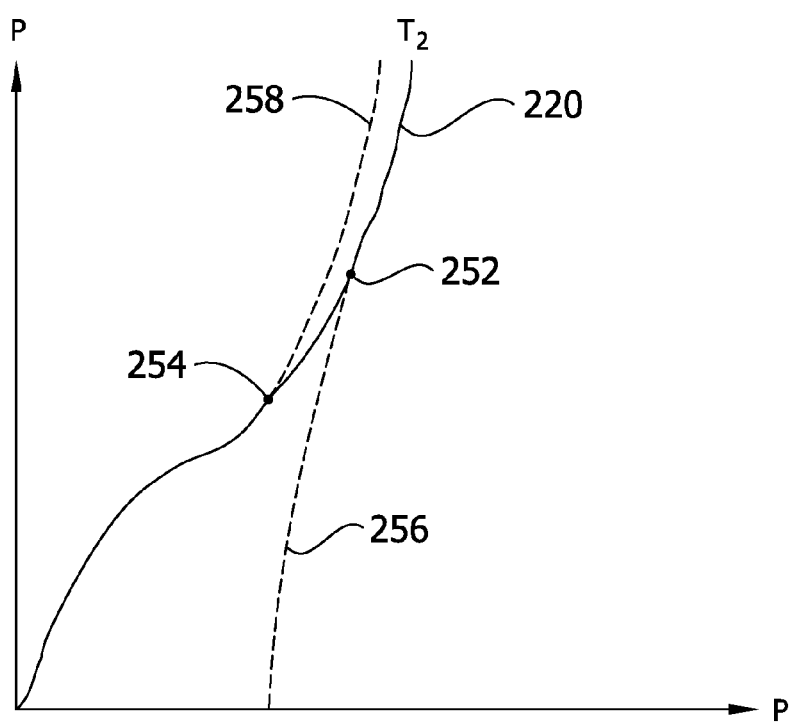
FIG. 4 illustrates another exemplary pressure versus density curve at a second temperature including a plot of pseudo-properties.

The equations for determining the departure points 242, 244 and the first and second extrapolation equations may be employed to determine thermodynamic properties at any temperature. Turning now to FIG. 4, a second set of extrapolation curves associated with the temperature $T_2$ is described. A third departure point 252 and a fourth departure point 254 determined based on the equations above for the exemplary curve 220 are illustrated. Note that the third departure point 252 and the fourth departure point 254 are closer to each other than the first departure point 242 is to the second departure point 244, a general result of the approach to determining departure points taught by the present disclosure. The first extrapolation equation may be used to generate the dotted line curve 256 and the second extrapolation equation may be used to generate the dotted line curve 258, each of which represent pseudo-properties.

In an embodiment, the thermodynamic equation of state application 130 may employ the determination of the first departure point $(\rho_{dp1}, P_{dp1})$ from an equation of state as described above in combination with previously known methods for determining thermodynamic properties and parameters from equations of state. For example, the paper "Effective Utilization of Equations of State for Thermodynamic Properties in Process Simulation" by P. M. Mathias, et al., published March 1984, in American Institute of Chemical Engineers Journal Volume 30, number 2, which is hereby incorporated by reference for all purposes, describes known techniques for determining thermodynamic properties. In an embodiment, the thermodynamic equation of state application 130 may employ the determination of the second departure point $(\rho_{dp2}, P_{dp2})$ from an equation of state as described above in combination with previously known methods for determining thermodynamic properties and parameters from equations of state. In an embodiment, the thermodynamic equation of state application 130 may employ the first extrapolation equation from an equation of state as described above in combination with previously known methods for determining thermodynamic properties and parameters from equations of state. In an embodiment, the thermodynamic equation of state application 130 may employ the second extrapolation equation from an equation of state as described above in combination with previously known methods for determining thermodynamic properties and parameters from equations of state.

In some situations, multiple of the determinations of departure points taught by the present disclosure may be combined with previously known extrapolation equations by the thermodynamic equation of state application 130 to determine thermodynamic properties and/or parameters. For example, the first departure point $(\rho_{dp1}, P_{dp1})$ and the second departure point $(\rho_{dp2}, P_{dp2})$ determined as described above may be combined with previously known extrapolation equations by the thermodynamic equation of state application 130 to determine thermodynamic properties and/or parameters. In some situations, multiple of the extrapolation equations taught by the present disclosure may be combined with previously known techniques for determining departure points from equations of state by the thermodynamic equation of state application 130 to determine thermodynamic properties and/or parameters. In a preferred embodiment, the determinations of the first and second departure points and two of the extrapolation equations taught by the present disclosure may be employed by the thermodynamic equation of state application 130.

In an embodiment, portions of the system 100 described above may be provided as a computer program product. For example, in an embodiment, the thermodynamic process simulator application 120 and/or the thermodynamic equation of state application 130 may be provided as a computer program product. In another embodiment, the thermodynamic process simulator application 120 and/or the thermodynamic equation of state application 130 may be part of a thermodynamics modeling application (not shown) that may be provided as a computer program product. The computer program product may comprise one or more computer readable storage medium having computer usable program code embodied therein implementing the functionality of the thermodynamics modeling application, the thermodynamic simulation application 120, and/or the thermodynamic equation of sate application 130. The computer program product may be embodied in removable computer storage media and/or non-removable computer storage media. The computer program product may be suitable for loading, by the computer 110, at least portions of the contents of the computer program product to secondary storage, non-volatile memory, and/or volatile memory of the computer 110. The computer program product may include data, data structures, files, executable instructions, and other information. A portion of the computer program product may comprise instructions that promote the loading and/or copying of data, data structures, files, and/or executable instructions to the secondary storage, the non-volatile memory, and/or volatile memory of the computer 110.

Figure 5:
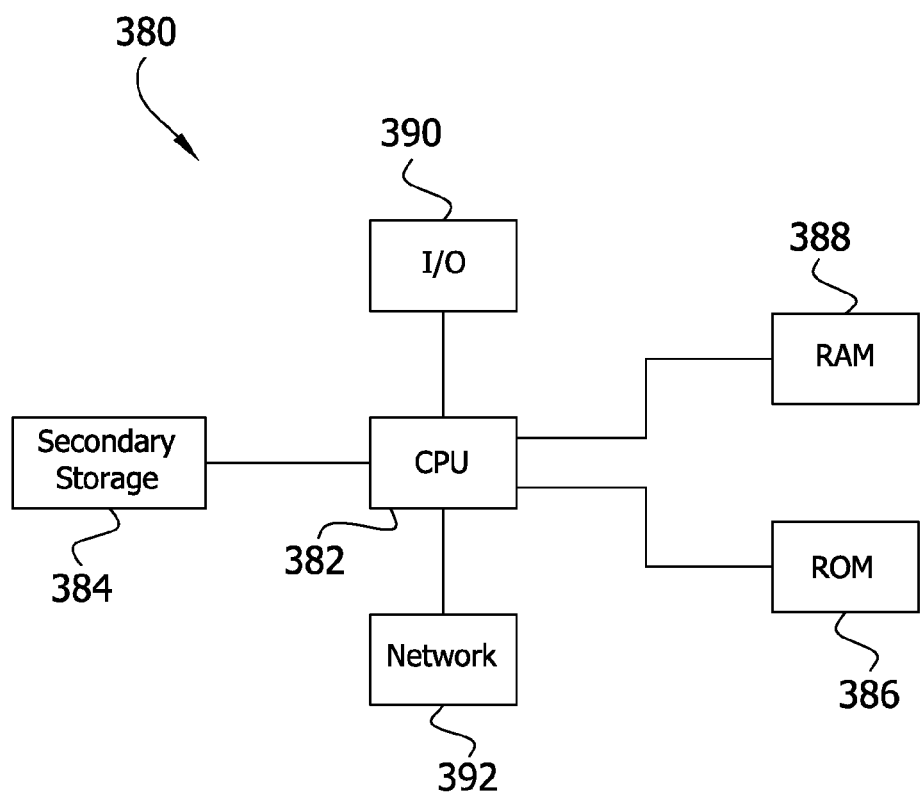
FIG. 5 is an illustration of a computer system according to an embodiment of the disclosure.

FIG. 5 illustrates a computer system 380 suitable for implementing the computer 110 described above. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intent is not to be limited to the details given herein. For example, the various elements or components may be combined or integrated in another system or certain features and formulas may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and could be made without departing from the spirit and scope disclosed herein.

What is claimed is:

1. A system, comprising:

a computer system comprising at least one processor;

a thermodynamic process simulation application; and a thermodynamic equation of state application that, when executed by the at least one processor of the computer system, determines a density root based on at least a specified pressure, a specified temperature, and a first point of departure from an equation of state, wherein the first point of departure is determined based on a proportional relationship between the ratio of pressure to density of the equation of state at the first point of departure and the rate of change of pressure with respect to density of the equation of state at the first point of departure, and wherein the density root is determined as a pseudo-density when the specified pressure is less than the pressure at the first point of departure, wherein the thermodynamic process simulation application executes on the at least one processor of the computer system and invokes the thermodynamic equation of state application iteratively to determine a result based on the density root determined by the thermodynamic equation of state application.

2. The system of claim 1, wherein the system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

3. The system of claim 1, wherein the first point of departure is determined as the point $(\rho_{dp1}, P_{dp1})$ on the isothermic curve of pressure P versus density $\rho$ at the specified temperature derived from the equation of state where $$\frac{\partial P}{\partial \rho} = \beta \frac{P}{\rho} + \Omega$$

where β is a constant selected subject to the constraint β≧0.5, where $$\frac{\partial P}{\partial \rho}$$

is the partial derivative of pressure P with respect to density ρ of the equation of state, and where Ω is an optional offset.

4. The system of claim 3, wherein the constant β is selected to have a value in the range from 0.7 to 3.0.

5. The system of claim 3, wherein the constant β is selected to have a value of about 1.0.

6. The system of claim 1, wherein the pseudo-density is determined based on a first extrapolation equation that comprises a density squared term.

7. The system of claim 6, wherein the first point of departure is designated as the point $(\rho_{dp1}, P_{dp1})$ and wherein the first extrapolation equation is $$P = P_{dp1} + b(\rho - \rho_{dp1}) + c(\rho - \rho_{dp1})^2$$

where b and c are constants.

8. The system of claim 7, wherein the constant $$b = \frac{\partial P}{\partial \rho}\bigg|_{dp1},$$

the value of the partial derivative of pressure P with respect to density ρ of the equation of state at temperature T at the first point of departure.

9. The system of claim 1, wherein the first point of departure is designated as the point $(\rho_{dp1}, P_{dp1})$ wherein the density root is further determined based on a specified phase and on a second point of departure from the equation of state, designated as the point $(\rho_{dp2}, P_{dp2})$, wherein $\rho_{dp2}$ is less than $\rho_{dp1}$, wherein the density root is determined as the pseudo-density when the specified phase is a phase two and the specified pressure is greater than $P_{dp2}$, and wherein the density root is determined as the pseudo-density when the specified phase is a phase one and the specified pressure is less than $P_{dp1}$.

10. The system of claim 9, wherein when the specified phase is a phase two and the specified pressure P is greater than $P_{dp2}$, the pseudo-density is determined based on a second extrapolation equation that asymptotically approaches the equation of state at high specified pressure.

11. The system of claim 1, wherein the result is a flash condition in a flash evaporator, a distillation condition in a distillation column, an absorption condition in an absorber column, a stripping condition in a stripper column.

12. A system, comprising:
a computer system comprising at least one processor;
a thermodynamic process simulation application; and
a thermodynamic equation of state application that, when executed by the at least one processor of the computer system, determines a density root based on at least a specified pressure, a specified temperature, a specified composition, and a second point of departure from an equation of state, wherein the second point of departure is determined based at least in part on a proportional relationship between the rate of change of pressure with respect to density of the equation of state and the universal gas constant, and wherein the density root is determined as a pseudo-density when the specified pressure is greater than the pressure at the second point of departure, wherein the thermodynamic process simulation application executes on the at least one processor of the computer system and invokes the thermodynamic equation of state application iteratively to determine a result based on the density root determined by the thermodynamic equation of state application.

13. The system of claim 12, wherein the system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

14. The system of claim 12, wherein the second point of departure is determined as the point $(\rho_{dp2}, P_{dp2})$ on the isothermic curve of pressure P versus density ρ at the specified temperature derived from the equation of state where $$\alpha\left(\frac{\partial P}{\partial \rho} - R\right) + (1-\alpha)\frac{\partial P}{\partial \rho}\bigg|_{dp1} = \Delta$$

where a=f(T), where a is a non-negative number less than or equal to 1.0, where R is the universal gas constant, where $$\frac{\partial P}{\partial \rho}\bigg|_{dp1}$$

is a constant equal to the value of the partial derivative of pressure P with respect to density ρ of the equation of state at a first point of departure for the specified temperature T, and where Δ is one of a zero value, a constant value, a function of temperature T, and a function of pressure P.

15. The system of claim 14, wherein f(T)=1.0 for all non-negative values of T.

16. The system of claim 14, wherein f(T) is less than 0.2 for T greater than 2000 K.

17. The system of claim 12, wherein the second point of departure is designated as the point $(\rho_{dp2}, P_{dp2})$, wherein the density root is further determined based on a specified phase one and on a first point of departure from the equation of state $(\rho_{dp1}, P_{dp1})$, wherein $\rho_{dp2}$ is less than $\rho_{dp1}$, wherein the density root is determined as the pseudo-density when specified phase is a phase two and the specified pressure is greater than $P_{dp2}$, and wherein the density root is determined as the pseudo-density when the specified phase is a phase one and the specified pressure is less than $P_{dp1}$.

18. The system of claim 17, wherein the first point of departure $(\rho_{dp1}, P_{dp1})$ is determined as the point on the isothermic curve of pressure P versus density ρ according to the equation of state at which the tangent line to the isothermic curve at the first point of departure coincides approximately to the line that passes through the first point of departure $(\rho_{dp1}, P_{dp1})$ and through the point (ρ=0,P=0).

19. The system of claim 18, wherein the acute angle formed by the tangent line with the line through the points $(\rho_{dp1}, P_{dp1})$ and (ρ=0,P=0) is less than 20 degrees.

20. The system of claim 12, wherein the second point of departure is designated as the point $(\rho_{dp2}, P_{dp2})$, wherein the pseudo-density is determined based on a second extrapolation equation that comprises a density squared term.

21. The system of claim 20, wherein the second extrapolation equation is $$P = P_{dp2} + d\left(\frac{1-g}{1-k\rho}\right)(\rho - \rho_{dp2}) + m\left(\frac{1-g}{1-k\rho}\right)(\rho - \rho_{dp2})^2$$

where d, g, k, and m are constants.

22. A system, comprising:
a computer system comprising at least one processor;
a thermodynamic process simulation application; and
a thermodynamic equation of state application that, when executed by the at least one processor of the computer system, determines a density root $\rho$ based on at least a specified pressure P, a specified temperature, a specified composition, and a first point of departure from an equation of state $(\rho_{dp1}, P_{dp1})$, wherein when the specified pressure is less than $P_{dp1}$ the density root $\rho$ is determined as a pseudo-density based on an extrapolation equation that comprises a density squared term,
wherein the thermodynamic process simulation application executes on the at least one processor of the computer system and invokes the thermodynamic equation of state application iteratively to determine a result based on the density root determined by the thermodynamic equation of state application, and
wherein the system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

23. The system of claim 22, wherein the extrapolation equation is $$P = P_{dp1} + b(\rho - \rho_{dp1}) + c(\rho - \rho_{dp1})^2 + \Gamma$$

where b and c are constants and where $\Gamma$ is an optional offset.

24. The system of claim 23, wherein the constant $$b = \left.\frac{\partial P}{\partial \rho}\right|_{dp1},$$

the partial derivative of pressure P with respect to density $\rho$ of the equation of state at temperature T at the first point of departure.

25. The system of claim 23, wherein the constant $$c = -\frac{\left(P_{dp1} + d\left.\frac{\partial P}{\partial P}\right|_{dp1}\right)}{d^2}$$

where d is a constant and where $$\left.\frac{\partial P}{\partial \rho}\right|_{dp1}$$

is the partial derivative of pressure P with respect to density $\rho$ of the equation of state at temperature T at the first point of departure.

26. The system of claim 25, wherein the constant $d = z_{dp1}(\rho_{sp} - \rho_{dp1})$ where $z_{dp1}$ is a constant equal to the compressibility at the specified temperature T, at pressure $P_{dp1}$, and at density $\rho_{dp1}$ and where $\rho_{sp}$ is the density at the specified temperature T of the spinoidal point of the isothermic curve of the equation of state.

27. A system, comprising:
a computer system comprising at least one processor;
a thermodynamic process simulation application; and
a thermodynamic equation of state application that, when executed by the at least one processor of the computer system, determines a density root $\rho$ based on at least a specified pressure P, a specified temperature, a specified composition, and a second point of departure from an equation of state $(\rho_{dp2}, P_{dp2})$, wherein when the specified pressure is greater than $P_{dp2}$ the density root $\rho$ is determined as a pseudo-density based on an extrapolation equation $$P = P_{dp2} + d\left(\frac{1-g}{1-k\rho}\right)(\rho - \rho_{dp2}) + m\left(\frac{1-g}{1-k\rho}\right)(\rho - \rho_{dp2})^2 + \Gamma$$

where d, g, k, and m are constants and where $\Gamma$ is an optional offset,
wherein the thermodynamic process simulation application executes on the at least one processor of the computer system and invokes the thermodynamic equation of state application iteratively to determine a result based on the density root determined by the thermodynamic equation of state application, and
wherein the system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

28. The system of claim 27, wherein the constant $$d = \left.\frac{\partial P}{\partial \rho}\right|_{dp2},$$

the value of the partial derivative of the pressure P with respect to density $\rho$ at the second point of departure of the equation of state at the specified temperature T.

29. The system of claim 27, wherein the constant $g = k\rho_{dp2}$, the product of the constant k times the value of density at the second point of departure of the equation of state at the specified temperature T.

30. The system of claim 27, wherein the constant $m = e^R - 1$, where R is the universal gas constant and e is the natural logarithm.

31. A system, comprising:
a computer system comprising at least one processor;
a thermodynamic process simulation application; and a thermodynamic equation of state application that, when executed by the at least one processor of the computer system, determines a density root based on at least a specified pressure, a specified temperature, a specified composition, a specified phase, a first point of departure from an equation of state, and a second point of departure from the equation of state, wherein the first point of departure is determined as the point $(\rho_{dp1}, P_{dp1})$ on the isothermic curve of pressure P versus density $\rho$ at the specified temperature derived from the equation of state where $$\frac{\partial P}{\partial \rho} = \beta \frac{P}{\rho} + \Omega$$

where $\beta$ is a constant selected subject to the constraint $\beta \geq 0.5$, where $\Omega$ is an optional offset, wherein the second point of departure is determined as the point $(\rho_{dp2}, P_{dp2})$ on the isothermic curve of pressure P versus density $\rho$ at the specified temperature derived from the equation of state where $$\alpha\left(\frac{\partial P}{\partial \rho} - R\right) + (1-\alpha)\frac{\partial P}{\partial \rho}\bigg|_{dp1} = 0$$

where a=f(T), where a is a non-negative number less than or equal to 1.0, where R is the universal gas constant, where $$\frac{\partial P}{\partial \rho}\bigg|_{dp1}$$

is a constant equal to the value of the partial derivative of pressure P with respect to density $\rho$ of the equation of state at the first point of departure for the specified temperature, wherein $\rho_{dp2}$ is less than $\rho_{dp1}$, wherein the density root is determined as a pseudo-density when the specified phase is a phase two and the specified pressure is greater than the pressure at the point $(\rho_{dp2}, P_{dp2})$, and wherein the density root is determined as a pseudo-density when the specified phase is a phase one and the specified pressure is less than the pressure at the point $(\rho_{dp1}, P_{dp1})$, wherein the thermodynamic process simulation application executes on the at least one processor of the computer system and invokes the thermodynamic equation of state application iteratively to determine a result based on the density root determined by the thermodynamic equation of state application.

32. The system of claim 31, wherein when the specified phase is a phase one and when the specified pressure is less than $P_{dp1}$ the density root $\rho$ is determined as a pseudo-density based on a first extrapolation equation $$P = P_{dp1} + b(\rho - \rho_{dp1}) + c(\rho - \rho_{dp1})^2$$

where b and c are constants and wherein when the specified phase is a phase two and the specified pressure is greater than $P_{dp2}$ the density root $\rho$ is determined as a pseudo-density based on a second extrapolation equation $$P = P_{dp2} + d\left(\frac{1-g}{1-k\rho}\right)(\rho - \rho_{dp2}) + m\left(\frac{1-g}{1-k\rho}\right)(\rho - \rho_{dp2})^2$$

where d, g, k, and m are constants.

33. The claim of 31, wherein the system processes the result determined by the thermodynamic process simulation application to execute at least one action from the following group of actions: controlling a thermodynamic process control component, training an operator of the thermodynamic process control component, predicting a failure time of the thermodynamic process control component, and validating a design for the thermodynamic process control component.

34. A computer program product for a thermodynamic modeling system, the computer program product comprising:
a computer readable storage medium having computer usable program code embodied therein;
computer usable program code to determine a density root based on at least a specified pressure, a specified temperature, a specified state, and a first point of departure from an equation of state, wherein the first point of departure is determined based on a proportional relationship between the ratio of pressure to density of the equation of state at the first point of departure and the rate of change of pressure with respect to density of the equation of state at the first point of departure, and wherein the density root is determined as a pseudo-density when the specified state is a first state and when the specified pressure is less than the pressure at the first point of departure.

35. The computer program product of claim 34, wherein the computer usable program code further determines a result based on the density root.

36. The computer program product of claim 34, wherein the first point of departure is determined as the point $(\rho_{dp1}, P_{dp1})$ on the isothermic curve of pressure P versus density $\rho$ at the specified temperature derived from the equation of state where $$\frac{\partial P}{\partial \rho} = \beta \frac{P}{\rho} + \Omega$$

where $\beta$ is a constant selected subject to the constraint $\beta \geq 0.5$, where $\Omega$ is an optional offset, where $$\frac{\partial P}{\partial \rho}$$

is the partial derivative of pressure P with respect to density $\rho$ of the equation of state.

37. The computer program product of claim 36, wherein the computer usable program code further determines the density root based at least in part on a second point of departure from the equation of state, wherein the second point of departure is determined based at least in part on a proportional relationship between the rate of change of pressure with respect to density of the equation of state and the universal gas constant, and wherein the density root is determined as a pseudo-density when the state is a second state and when the specified pressure is greater than the pressure at the second point of departure.

38. The computer program product of claim 37, wherein the second point of departure is determined as the point $(\rho_{dp2},$ $P_{dp2}$) on the isothermic curve of pressure P versus density ρ at the specified temperature derived from the equation of state where $$\alpha\left(\frac{\partial P}{\partial \rho} - R\right) + (1-\alpha)\frac{\partial P}{\partial \rho}\bigg|_{dp1} = 0$$

where a=f(T), where a is a non-negative number less than or equal to 1.0, where R is the universal gas constant, where $$\frac{\partial P}{\partial \rho}\bigg|_{dp1}$$

is a constant equal to the value of the partial derivative of pressure P with respect to density ρ of the equation of state at a first point of departure for the specified temperature T.

* * * * *